A. O. RUTZ.
BELT.
APPLICATION FILED JUNE 20, 1918.

1,429,638.

Patented Sept. 19, 1922.
2 SHEETS—SHEET 1

Inventor
Arnold O. Rutz
By Brown Hanson & Certcher
Attorneys

A. O. RUTZ.
BELT.
APPLICATION FILED JUNE 20, 1918.
1,429,638.
Patented Sept. 19, 1922.
2 SHEETS—SHEET 2.
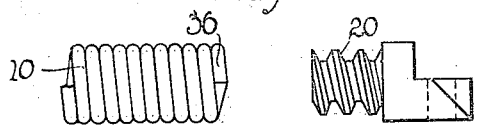
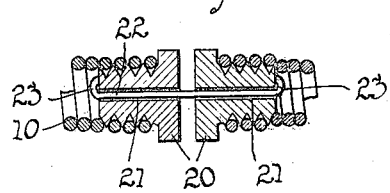
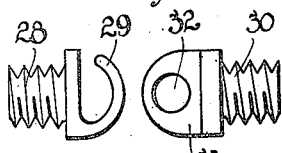
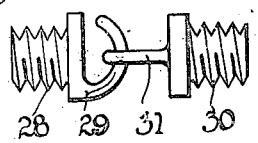
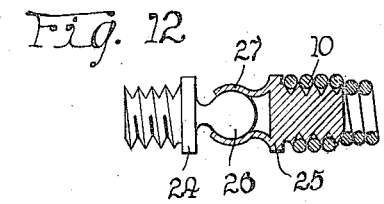
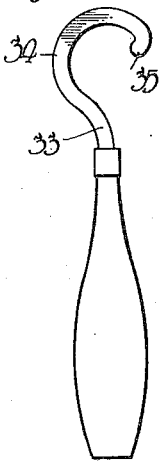
Inventor
Arnold O. Rutz
By Brown, Hansen & Austin
Attorneys Patented Sept. 19, 1922.

1,429,638

UNITED STATES PATENT OFFICE.

ARNOLD O. RUTZ, OF MILWAUKEE, WISCONSIN, ASSIGNOR TO MILWAUKEE GAS SPECIALTY COMPANY, OF MILWAUKEE, WISCONSIN, A CORPORATION OF WISCONSIN.

BELT.

Application filed June 20, 1918. Serial No. 240,987.

*To all whom it may concern:*

Be it known that I, ARNOLD O. RUTZ, a citizen of the United States, residing at Milwaukee, in the county of Milwaukee and State of Wisconsin, have invented a certain new and useful Improvement in Belts, of which the following is a full, clear, concise, and exact description, reference being had to the accompanying drawings, forming a part of this specification.

My invention relates to the transmission of power and has special reference to power transmission belts.

Generally, the object of my invention is to provide a power belt, which shall be more enduring, more efficient, easier applied, and which shall have more perfect contact with the pulley faces.

A further object of my invention is to make use of relatively small pieces of leather in the production of belts of any desired power capacity, to provide a relatively heavy belt at low cost, which shall conform accurately to the belt surface of crowned pulleys and which shall prevent the formation of air pockets between the belt and pulley.

My invention provides a power belt made up of relatively short or narrow sections which extend across the belt, these sections being made up of one or more pieces arranged end to end and a sufficient number of these sections strung on a plurality of parallel coiled springs long enough to extend through the belt from end to end and having their respective ends coupled together to make the belt endless.

Several features of my invention relate to improvements in the means for coupling the ends of the longitudinal tension springs and others relate to the use of pre-formed sections, curved to fit crowned pulleys.

My invention also consists in the several combinations and arrangements of parts and in the features of construction by which I am enabled to attain the above mentioned and other objects, and all as hereinafter described and particularly pointed out in the appended claims.

My invention will be more readily understood by reference to the accompanying drawings in which—

Figures 7 and 8 are similar views showing another form of connector;

Figure 9 is a central longitudinal sectional view of a swivel form of connector;

Figures 10 and 11 are side elevations of another form of connector;

Figure 12 is a side elevation, partly in section of still another form of connector; and Figure 13 is a view in elevation of a tool for use in assembling the parts of my improved belt.

I am aware that belts of the general character disclosed herein have been proposed, but so far as I have been informed, no one has heretofore proposed or suggested to form the transverse leather elements of more than one piece, nor to pre-curve the leather sections to fit crowned pulleys, nor to provide spring connectors of the improved form shown.

My improved belt consists of a plurality of substantially endless longitudinally extending springs or tension members 10, to take the pull of the belt, and transversely arranged and extending pulley contacting and wearing members 11 carried by the tension members and preferably arranged normally substantially contacting with each other.

The wearing members are preferably made of leather and may each consist of a single piece as "a", extending from side to side of the belt, or may be made up of two or more shorter pieces as shown at "b".

The tension springs 10 are proportioned as to size of wire, size of coil and number of springs used, to produce a belt of such a strength that the belt will properly transmit the required quantity of power without undue tension being imposed on the springs.

Figure 3:
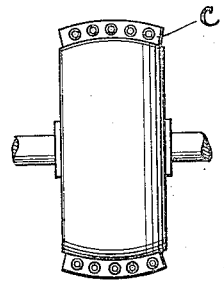
Figures 2 and 3 are views in elevation, particularly showing the form that my improved belt takes when applied to a pulley of relatively small diameter and relatively high crown.
Figure 2:
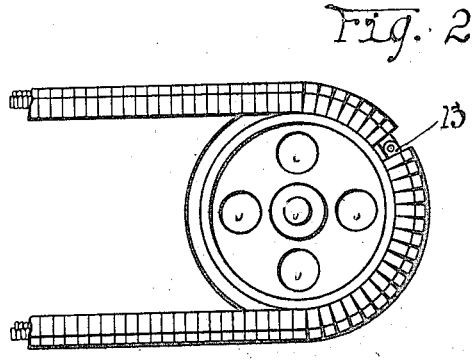

In providing belts for use with crowned pulleys I may curve the leather sections 11 as shown at "c", Figure 3, so that they will substantially contact with the pulley 12 throughout their length, or I some times find it advantageous to make up the sections of several short pieces as shown at "b", which short pieces result in the production of a belt which is obviously quite flexible transversely of the belt and capable of conforming to the crowned pulley without being pre-formed for this purpose.

Figure 1:
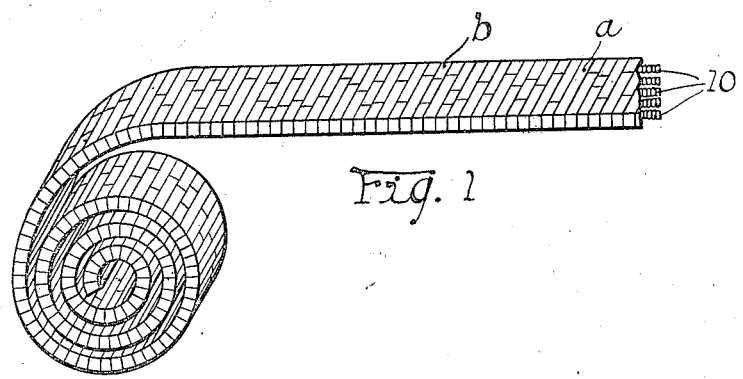
Figure 1 is a fragmentary view in perspective of a partially unrolled coil of belting, illustrating a preferred form of my invention.

In making up a belt in the latter manner I prefer to use few, if any, leather sections, made of a single piece extending across the belt from side to side, but to overlap the short pieces, as shown in Figure 1, a sufficient number of the short pieces being provided with holes for two or more of the springs and being arranged in such overlapping or zig zag relation that the several tension members are properly held in their relative positions.

For connecting the ends of the spring tension member together and thus making the belt endless I have provided a novel form of connector which is readily and easily connected to the spring without preliminary work on the spring except to cut it to the proper length and which when in place cannot readily be removed and cannot, in fact, become loosened, except it be intentionally done.

Figure 4:
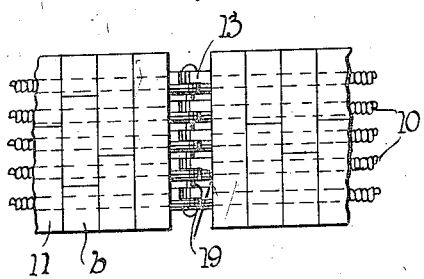
Figure 4 is a fragmentary plan view of the belt illustrating the means for connecting the ends of the belt together.
Figure 5:
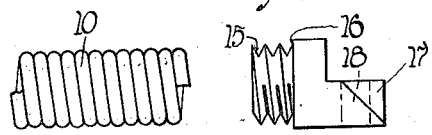
Figures 5 and 6 are views in elevation, particularly illustrating one form of connector for the ends of the tension springs.
Figure 6:
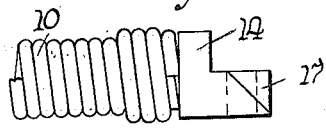

My improved connecting device 13 consists of a pair of similar connecting members 14 each of which has a threaded end 15 of a diameter and pitch of thread to be screwed or threaded into the end of the spring 10 as clearly shown in Figures 5 and 6. Each member 14 also has a shoulder 16 to limit the distance which it can be screwed into the spring, and at the opposite end an offset hinge part 17 adapted for co-operation with a similar part on the opposite end of the spring for connecting the two ends together. These hinge parts are provided with registering perforations 18 to receive a connecting pin, rod, or wire 19 (Figure 4) for connecting the two ends of the belt together. The pin 19 is preferably passed through the several connectors as shown and may be retained in position by riveting the ends as shown in Figure 4 or in any other suitable manner.

The threaded connection illustrated in Figures 5 and 6 is of such a relative diameter that the end of the spring coil is enlarged as it is threaded thereupon. This serves to produce such a firm grip between the spring and the threaded stem that the spring is held firmly thereon, even though the stem is of a length to receive but two or three of the turns of the spring.

In Figures 7 and 8 I have illustrated another method of causing the holding grip between the spring and the stem, that is, by making the thread 20 on the stem of greater pitch than the pitch of the spring so that when the stem is screwed into the end 36 of the spring, the coils thereof shall be forcibly spread apart as shown in Figure 8, thus causing a grip between the stem and the spring.

I find that to secure the best results it is necessary to either make the stem of a size to enlarge the spring or to make the pitch of the stem greater than the pitch of the spring for the reason that in screwing the stem into the spring the spring is unwound slightly, which temporarily enlarges the spring sufficiently to permit the easy entrance of the stem, and when it is attempted to take the spring out by unscrewing it, the slight friction inherent between the stem and the spring coil causes the spring to be contracted upon the stem and to hug it with greater and greater force the more it is attempted to unscrew the stem out of the spring. It should be understood that I make the entire connector 13 as short as possible from the center of the connecting pin to the end of the threaded stem so that the belt can best conform itself at this point to the curvature of small pulleys.

In Figure 9 I have illustrated a connector for the coil tension member, in which the two threaded ends are swivelly joined. In this form the threaded members 20 for receiving the ends of the coiled spring tension members 10 are duplicates of each other. Each is provided with a central longitudinal hole 21, through which I thread a connecting wire or rod 22. I secure the wire connector 22 in place and the two parts 20 together by any suitable means, such as bending the ends 23 of the wire 22 as shown. While the two parts 20 are thus permanently connected together, they are left free to be threaded into respective ends of the coiled spring tension members.

In Figure 12 I have illustrated another form of swivelly connected threaded connectors 24 and 25. The member 24 is provided with a ball 26 and the member 25 is provided with a socket 27 to receive and retain the ball, and form a universal joint between the two members 24 and 25. This joint, while it holds the two members 24 and 25 permanently joined, permits the independent screwing of the members into the coiled spring tension members.

In Figures 10 and 11 I have illustrated a form of connector which is adapted for the independent threading of the members into the respective coiled spring tension members, and then the hooking of the connectors together. In this form the threaded member 28 is provided with a centrally arranged hook 29 and the other threaded member 30 is provided with a centrally arranged projection 31 having a central hole 32 to receive the hook 29 as best shown in Figure 11.

It is obvious that the threaded ends of these several forms of connectors can be made in any one of the several ways for providing a grip between the coiled tension member 10 and the threaded connectors.

When the belt is in use the side which is in tension is slightly elongated, particularly if it is transmitting power anywhere near its capacity, consequently the leather sections are separated slightly from each other and as they pass around the pulley they cannot pocket the air between the belt and the pulley as is done in a solid belt for the reason that the spacing between the sections permits the air to escape, consequently this form of belt results in a maximum of frictional contact with the pulleys over which it is trained.

I find that the part of the belt occupied by the connectors 13 and not provided with transverse contact strips is not sufficient in area to materially effect the frictional contact of the belt with the pulley.

In making up the springs 10 I preferably, as illustrated, wind the coils in close contact with each other and I preferably cut the springs of such a length in relation to the length of the belt and the relative position of the end strips of the belt that the springs are slightly elongated or put under a tension equal to approximately one-half of the maximum driving effort or tension when the connector members 14 are screwed into place and consequently the belt as a whole is under a preliminary tension even when the leather strips are in contact with each other, and before the belt is placed in operative position upon the pulleys.

When the belt is then placed under its maximum driving tension for which it is designed, the tension will all appear upon the driving side. If it is attempted to drive a greater load, the increased tension will cause slack and loss of gripping power so that the belt will slip and limit the transmission of power to the predetermined maximum. This is a valuable feature. The crowned belt shown in Figure 3 will remain on the pulley even when slippage occurs.

The belt may be made up in lengths of any desired quantity as indicated in Figure 1 and cut to desired stock sizes. The connectors shown in Figures 4 to 12 may be employed in making connections between short pieces to make a belt of any desired length.

I find it highly desirable to make the belt of a minimum thickness because of the reduction in internal friction. To this end it is desirable to make the springs of small diameter and to employ a greater number in the lateral width of the belt.

For convenience in manipulating the coiled springs 10 so as to permit the easy screwing in and removal of the threaded connectors, I provide a spanner wrench 33, as shown in Figure 13. This wrench has a hooked end 34 provided with an inwardly extending projection 35 adapted to engage the free end 36 of the spring 10 (see Figures 7 and 8) in an obvious manner. By use of this wrench I am enabled to uncoil and expand the end portions of the springs 10 sufficiently to permit the insertion and removal of the threaded connectors.

I do not intend to be limited to the precise details of construction shown and described.

I claim:

1. A power belt comprising a plurality of parallel expansible tension members, and a pulley contacting and wearing surface composed of transversely extending sections arranged side by side, some of which are composed of two or more pieces arranged end to end and having holes for receiving the tension members.

2. In a power belt a plurality of coiled spring tension members extending longitudinally of the belt, in combination with a sectional wearing surface composed of transversely arranged sections having holes for receiving the springs, and arranged on the springs in substantial contact with each other, a plurality of such sections being made up of more than one piece.

3. In a power belt, the body of the belt comprising transversely arranged leather sections relatively narrow longitudinally of the belt, the sections composed of pieces of various lengths and the pieces of successive sections arranged in overlapping relation, said sections provided with registering openings, spring tension members extending through said openings, and means hingedly connecting the respective ends of the tension members together to make the belt endless.

4. In a power belt of the character described, longitudinally arranged tension members, in combination with transversely arranged relatively rigid wearing members carried thereby, the rigid members being made up of relatively short sections arranged end to end and the sections of successive members arranged in overlapping relation to permit the belt to conform to crowned pulleys when used thereon.

5. In a belt of the character described, transversely extending sectional wearing strips, in combination with a plurality of longitudinally extending coiled spring tension members arranged within said transverse strips, coupling members frictionally engaged with the ends of the tension members, and means for hingedly connecting the coupling members of respective coiled springs.

In witness whereof, I hereunto subscribe my name this 18 day of June A. D. 1918.

ARNOLD O. RUTZ.

In presence of—
WM. RANSEHT,
LOTTIE SIMMONS.